(No Model.) 2 Sheets—Sheet 1.

H. J. WILLIAMS & S. C. WARNER.
FRUIT BRUSHING MACHINE.

No. 440,677. Patented Nov. 18, 1890.

Witnesses.
Edward H. Risley
E. L. Clarke

Inventor:
H. J. Williams
S. C. Warner
By Risley & Love atty.

(No Model.) 2 Sheets—Sheet 2.
H. J. WILLIAMS & S. C. WARNER.
FRUIT BRUSHING MACHINE.
No. 440,677. Patented Nov. 18, 1890.
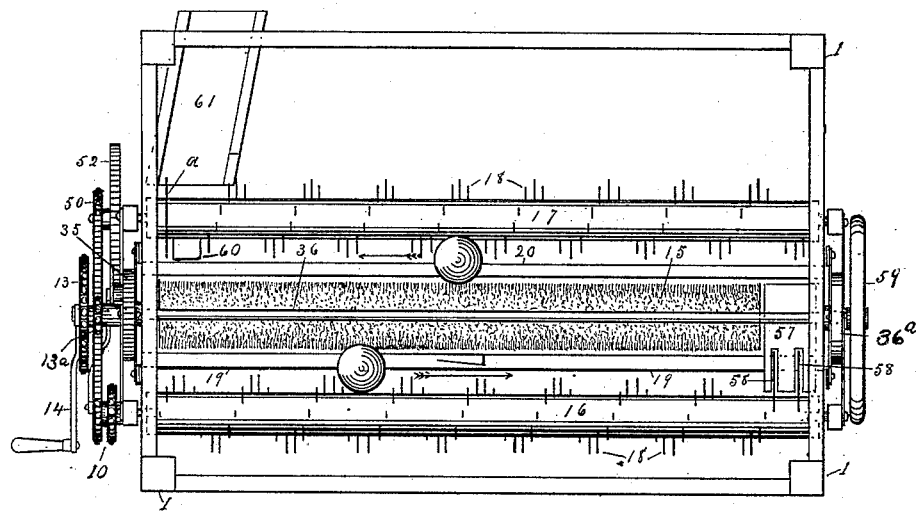
Fig. 4.
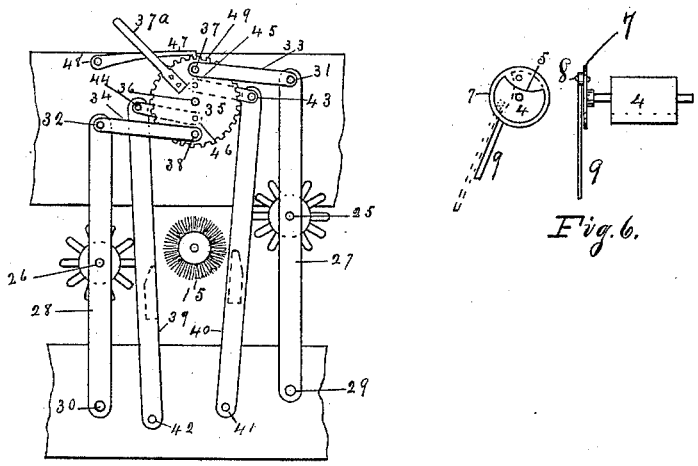
Fig. 5.
Fig. 6.
Witnesses.
Edwin H. Riley
E. L. Clarke
Inventor:
H. J. Williams
S. C. Warner
By Riley Henry attys

UNITED STATES PATENT OFFICE.

HUMPHREY J. WILLIAMS AND SAMUEL CAMPBELL WARNER, OF NEW YORK MILLS, NEW YORK.

FRUIT-BRUSHING MACHINE.

SPECIFICATION forming part of Letters Patent No. 440,677, dated November 18, 1890.

Application filed January 10, 1889. Serial No. 296,023. (No model.)

*To all whom it may concern:*

Be it known that we, HUMPHREY J. WILLIAMS and SAMUEL CAMPBELL WARNER, of New York Mills, Oneida county, New York, have invented a certain new and useful Improvement in Fruit-Brushing Machines; and we hereby declare that the following is a full, clear, and exact description of the invention, which will enable others skilled in the art to which it appertains to make and use the same, reference being had to the accompanying drawings, and to the letters and figures of reference marked thereon, which form part of this specification.

Our invention relates to a brushing-machine for cleaning the surfaces of oranges or similar fruit; and it consists in the mechanism hereinafter pointed out and claimed.

Figure 1:
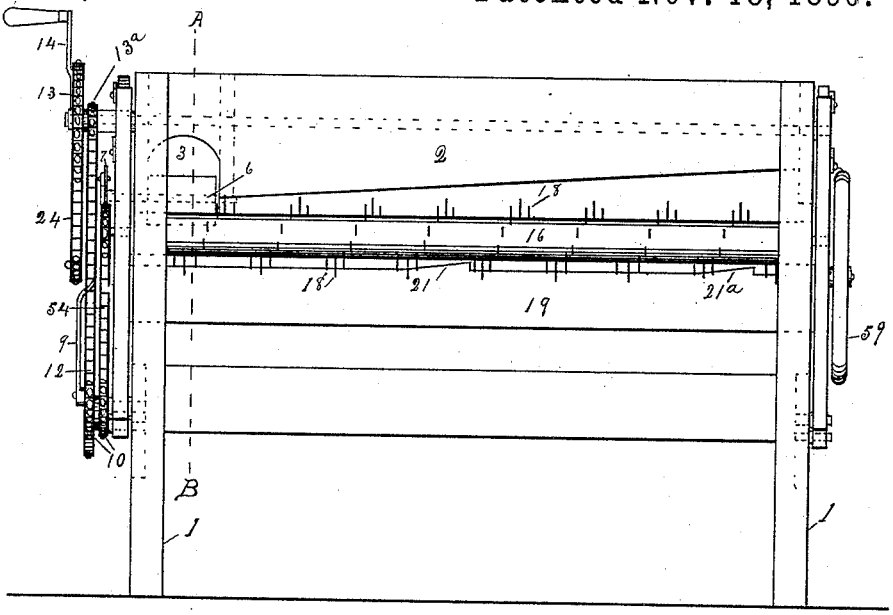
Figure 2:
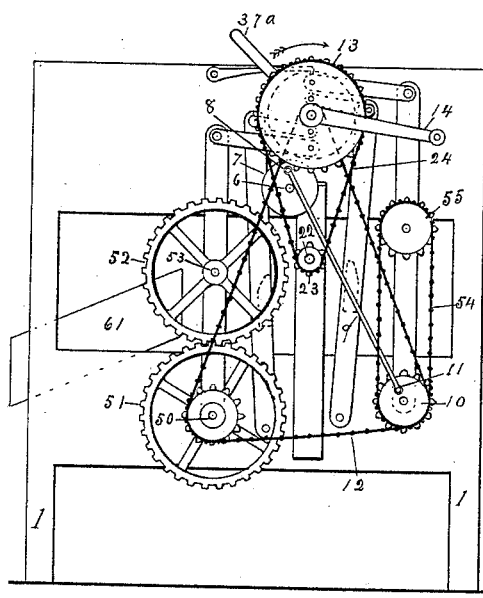
Figure 3:
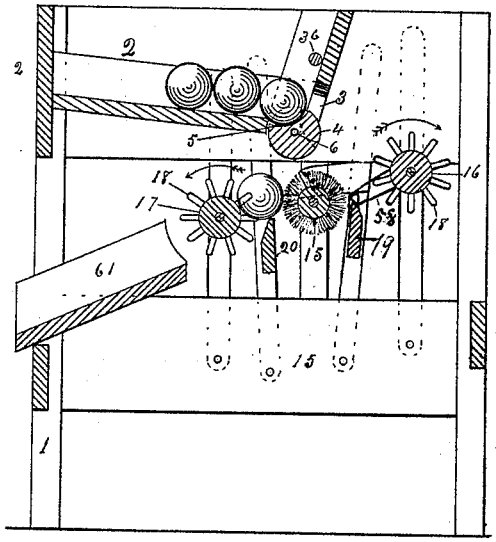

In the drawings, Figure 1 represents a side elevation of our machine. Fig. 2 represents an end view taken from the left of Fig. 1. Fig. 3 represents a vertical section on line A B of Fig. 1. Fig. 4 represents a plan view of our machine with the hopper removed. Fig. 5 represents a portion of the adjusting mechanism, taken from Fig. 2 with the gears removed; and Fig. 6 represents details of construction of our feeding device.

In the drawings similar figures of reference refer to corresponding parts throughout the several figures.

We provide frame 1 of suitable construction for supporting the working mechanism, hereinafter more fully described.

In the upper portion of the frame we provide inclined hopper 2, having an inclined floor and sides with opening 3, Fig. 3, at the lowest point of the hopper so arranged that the fruit to be operated upon will by gravity move down to and through opening 3 at the lowest point in the hopper. Any other suitable hopper may be provided through which the fruit may be supplied to the machine.

In opening 3 in the hopper we provide what we term a "feeding" device, which feeds one article at a time and operates as follows: Roller 4, Figs. 3 and 6, is pivoted in the hopper at opening 3, and is provided with a semicircular groove or recess 5 for receiving and carrying a single article of fruit. Roller 4 has a rocking motion produced by the following mechanism: On the end of the shaft 6 on which the roller is mounted we secure disk 7, Fig. 2. Disk 7 is provided with a projecting pin or wrist 8, to which is secured one end of a connecting-rod 9, which connects at its opposite end to a crank-pin 11 on sprocket-wheel 10. The unequal pivoting of the connecting-rod with disk 7 and sprocket-wheel 10 produces a rocking motion of roller 4 with each revolution of sprocket-wheel 10. The roller 4 is rocked from the position shown in Fig. 3 and in broken lines in Fig. 6, in which it receives the fruit from the hopper, to that shown in full lines in the left-hand portion of Fig. 6, when it discharges the fruit to the brush, the fruit passing over the roller. Movement is imparted to the roller 4 through the mechanism already described, and link belt 12, Fig. 2, running over sprocket-wheel 13ª, rigidly connected to sprocket-wheel 13 and sprocket-wheels 10 and 50. Both of these sprocket-wheels 13 and 13ª are mounted loosely on the shaft 36, Fig. 4, and are driven by crank 14 or other suitable power. Sprocket-wheel 10 is provided with two sprocketed bearing-surfaces, as shown in Fig. 4. The belt which drives the sprocket-wheel 10 runs over the outer bearing-surface. Double sprocket-wheel 10 runs on a suitable bearing fixed in the frame.

Underneath the feeding device already described we provide rotating brush 15, Figs. 3 and 4, mounted on bearings at each end in the frame. The brush is mounted on shaft 22, Fig. 2, which preferably passes through the brush and runs in bearings in the frame, and on one end of the shaft we provide sprocket-wheel 23, Fig. 2, rigidly secured thereto. The brush is driven by endless belt 24, running on sprocket-wheels 13 and 23, so as to impart the required rotary motion to the brush.

Mounted on suitable bearings in the frame we provide on each side of the brush carriers 16 and 17, Figs. 3 and 4, each of which carriers is provided with a spiral projection, preferably composed of independent projections or pins, although a continuous spiral projection may be provided. We prefer the independent projections, as they more efficiently rotate the fruit against the brush and furnish less place of lodgment for dirt. The projections on the carriers are provided for carrying each article to be operated on along tracks 19 and 20, Figs. 3, 4, and 5, between the brush and carriers. In the machine, as shown, the fruit moves from the left to the right hand end of the machine, and is then returned from the right to the left, as hereinafter explained. Tracks 19 and 20, between the carriers and the brush on which the fruit moves, are adjustable with reference to the brush and carriers by being mounted upon swinging arms, as hereinafter set forth. On the surface of tracks 19 and 20, on which the fruit moves, may be provided projections 21, which serve to change the position of the fruit moving on the tracks with more certainty and present all its sides to the brush and prevent it from sliding along the tracks and not presenting all its surfaces to the brush. A projection $21^a$ may also be provided, which serves to raise the fruit onto the connecting-track passage-way or chute 57, whereby it is transferred from track 19 to track 20 upon the opposite side of the brush. It is evident that projections 21 and $21^a$ are not essential, but only expedient. The chute 57 is inclined from the track 19 to track 20, and the fruit rolls across by its own gravity. The inclined projection $21^a$ is provided to facilitate the fruit more readily getting onto the inclined chute 57, and so the chute will pass above the shaft which carries the brush. It is evident that the construction could be varied in several particulars, so that the inclined projection $21^a$ would not be necessary or even expedient.

The tracks and carriers are adjustable with reference to each other and to their location to the brush by the use of the following mechanism: The carriers are journaled at each end, as shown at 25 and 26 of Fig. 5, in swinging arms 27 and 28, provided at each end of the frame and pivoted thereto at 29 and 30, and these arms are connected at their upper ends at 31 and 32 by connecting-links 33 and 34 to toothed wheel 35 at points 37 and 38. Wheel 35 is secured to shaft 36, Figs. 4 and 5, which passes through the machine and has disk $36^a$ connected at the opposite end thereof, to which disk is connected a similar system of swinging arms and connecting-links to that already described, so that when the toothed wheel 35 on the shaft 36 is operated by the lever $37^a$, Fig. 5, the carriers are adjusted out or in from the brush to accommodate articles of different size. Tracks 19 and 20 are mounted at each end in swinging arms 39 and 40, pivoted to the frame at 41 and 42, respectively, their upper ends being connected or pivoted at 43 and 44 to suitable connecting-rods, which pass to wheel 35, and are pivoted thereto at 45 and 46, respectively, the pivotal points 45 and 46 being preferably nearer the center of the wheel than the pivotal points 37 and 38 of the links connecting with the arms carrying the bearings of the carriers. A similar system of arms carrying the other ends of the tracks is provided upon the other end of the machine and having substantially the same connections. When the carriers and tracks are adjusted in the position desired and suitable to the size of the fruit being operated on, they are held by pawl 47, pivoted to the frame at 48, the pawl engaging teeth 49 on the periphery of the toothwheel 35. Power is transmitted to carrier 16 by endless belt 54, Fig. 2, running over the inner bearing-surface of double sprocket-wheel 10 and sprocket-wheel 55, rigidly held to the end of the shaft of carrier 16, and power is transmitted to carrier 17 by the belt 12, passing over the sprocket 50, mounted on a suitable bearing in the frame, the sprocket-wheel 50 being rigidly connected to gear-wheel 51, which meshes into and drives gear-wheel 52. Gear-wheel 52 is rigidly fixed to the end of the shaft of carrier 17. On the end of the shaft carrying the brush we mount balance-wheel 59, Fig. 1, for regulating the speed of the machine when the same is operated by crank 14 or other suitable power. At the right-hand end of carrier 16 and secured thereto we provide projections 58 58, Fig. 3, for moving the fruit onto the inclined chute 57, Fig. 4, which chute conducts the fruit to the carrier and track upon the opposite side of the brush, the direction of the movement of the fruit along the tracks 19 and 20 being shown by the arrows. At the left-hand end of carrier 17, Fig. 4, we provide the projecting flange $a$, Fig. 4, extending around the carrier, which operates to stop the movement of the fruit when it reaches the flange, and in the same end of the carrier we provide a projecting lifter 60, rigidly secured to the carrier and projecting beyond the periphery thereof, so that when the fruit is brought down against flange $a$ by the movement of the carrier projecting lifter 60 engages the fruit on the under side and carries it over the carrier and discharges it on the inclined chute 61, Figs. 3 and 4, by which it is discharged from the machine.

Various modifications from the mechanism already described will readily suggest themselves, which various modifications are within the scope of our invention and the equivalents of our construction.

What we claim as new, and desire to secure by Letters Patent, is—

1. In a brushing-machine, the combination of a rotary brush, the carrier provided with a spiral projection thereon, the swinging arms in which the carrier is mounted, means for adjusting them with reference to the brush, and the track between the brush and the carrier.

2. In a brushing-machine, the combination, with a rotating brush, of a carrier provided with a spiral projection, swinging arms for the carrier, the track between the brush and the carrier, and swinging arms for the track, substantially as set forth.

3. The combination of a rotating brush, a carrier provided with a spiral projection, arms for the carrier, adjusting mechanism for the arms, a track between the carrier and the brush, swinging arms in which the track is mounted, and adjusting mechanism for the arms, whereby the carrier and track are adjustable with reference to the brush.

4. The rotating brush, in combination with the rotating carriers arranged on opposite sides of the brush, each carrier provided with a spiral projection composed of independent projections, the tracks between the brush and carriers, and the connecting-chute between the tracks, substantially as set forth.

5. The rotating brush, in combination with the rotating carrier having a spiral projection thereon, and a track arranged between the brush and carrier, swinging arms in which the carrier is mounted, and adjusting mechanism connecting with the swinging arms of the track and carrier, whereby the carrier and track are adjustable with reference to each other and to the brush.

6. In a brushing-machine, the combination of the rotating brush, rotating carriers, each carrier having a spiral projection, the two tracks arranged between the brush and carriers, and the connecting-chute connecting the tracks, substantially as set forth.

7. The combination, in a brushing-machine, of a rotating brush, the two rotating carriers each provided with a spiral projection, the tracks arranged between the carriers and the brush having inclined projections thereon, and the connecting-chute between the tracks, substantially as set forth.

8. The combination, in a brushing-machine, of the rotating brush, the rotating carriers, the swinging arms in which they are mounted, the tracks arranged between the carriers and the brush, the connecting-chute between the tracks, the swinging arms in which the tracks and carriers are mounted, and the connecting-links and ratchet-wheel for adjusting the tracks and carriers with reference to the brush, substantially as set forth.

In witness whereof we have hereunto affixed our signatures in presence of two witnesses.

HUMPHREY J. WILLIAMS.
S. CAMPBELL WARNER.

Witnesses as to signature of Humphrey J. Williams:
EDWIN H. RISLEY,
DANIEL MCGUCKIN.

Witnesses as to signature of S. Campbell Warner:
B. PUTNAM CALHOUN,
WILLIAM R. DEWITT, Jr.